United States Patent
Liu et al.

(10) Patent No.: US 8,140,715 B2
(45) Date of Patent: Mar. 20, 2012

(54) VIRTUAL MEDIA INPUT DEVICE

(75) Inventors: Zicheng Liu, Bellevue, WA (US);
Rajesh K. Hegde, Redmond, WA (US);
Philip A. Chou, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 83 days.

(21) Appl. No.: 12/473,298

(22) Filed: May 28, 2009

(65) Prior Publication Data

US 2010/0302462 A1   Dec. 2, 2010

(51) Int. Cl.
*G06F 3/00* (2006.01)
*G06F 13/00* (2006.01)
(52) U.S. Cl. ............. 710/8; 710/5; 710/15; 710/33
(58) Field of Classification Search ............... None
See application file for complete search history.

(56) References Cited

U.S. PATENT DOCUMENTS

| | | | |
|---|---|---|---|
| 5,625,697 A | | 4/1997 | Bowen et al. |
| 7,333,622 B2 | | 2/2008 | Algazi et al. |
| 7,389,153 B2 | | 6/2008 | Giaimo, III et al. |
| 2002/0075295 A1 | * | 6/2002 | Stentz et al. ............. 345/727 |
| 2005/0104973 A1 | * | 5/2005 | Iizuka ..................... 348/211.1 |
| 2005/0175190 A1 | | 8/2005 | Tashev et al. |
| 2005/0281410 A1 | | 12/2005 | Grosvenor et al. |
| 2006/0013416 A1 | | 1/2006 | Truong et al. |
| 2006/0083389 A1 | * | 4/2006 | Oxford et al. ............. 381/92 |
| 2006/0210096 A1 | | 9/2006 | Stokes et al. |
| 2006/0269086 A1 | | 11/2006 | Page et al. |

OTHER PUBLICATIONS

McGriffy, David, "Visual Virtual Microphone," retrieved at <<http://www.mcgriffy.com/audio/ambisonic/vvmic/>>, accessed on Apr. 2, 2009, 6 pages.
"Direct Audio Recorder," retrieved at <<http://www.sharewareconnection.com/direct-audio-recorder.htm>>, accessed on Apr. 2, 2009, 3 pages.
"Microphone Array Support in Windows Vista," retrieved at <<http://download.microsoft.com/download/9/c/5/9c5b2167-8017-4bae-9fde-d599bac8184a/MicArrays.doc>>, Aug. 26, 2005, 19 pages.
"Akustica Works to Solve PC VoIP Voice-Quality," retrieved at <<http://www.akustica.com/documents/Press-Release-SigmaTelCollaboration.pdf>>, Akustica, Inc., Pittsburg, PA, Aug. 24, 2005, 1 page.
"Audio Sound Record Pro ActiveX SDK—1.01," download page, Viscom Software, retrieved at <<http://www.brothersoft.com/audio-sound-record-pro-activex-sdk-102643.html>>, accessed on Apr. 2, 2009, 3 pages.

* cited by examiner

*Primary Examiner* — Tariq Hafiz
*Assistant Examiner* — Scott Sun

(57) ABSTRACT

A virtual media device is described for processing one or more input signals from one or more physical media input devices, to thereby generate an output signal for use by a consuming application module. The consuming application module interacts with the virtual media device as if it were a physical media input device. The virtual media device thereby frees the application module and its user from the burden of having to take specific account of the physical media input devices that are connected to a computing environment. The virtual media device can be coupled to one or more microphone devices, one or more video input devices, or a combination of audio and video input devices, etc. The virtual media device can apply any number of processing modules to generate the output signal, each performing a different respective operation.

18 Claims, 7 Drawing Sheets

ILLUSTRATIVE PROCESSING FUNCTIONALITY
132

BEST DEVICE SELECTION MODULE
402

GAIN NORMALIZATION MODULE
404

SOURCE SEPARATION MODULE
406

ECHO CANCELLATION MODULE
408

MIXER MODULE
410

OTHER MODULE(S)
412

FIG. 4

EXAMPLE OF ONE ILLUSTRATIVE COMBINATION OF PROCESSING MODULES

MANAGEMENT OF THE VIRTUAL MEDIA DEVICE

VIRTUAL MEDIA INPUT DEVICE

BACKGROUND

At any given time, a computing device may be coupled to two or more input devices that perform the same basic function. For example, a computing device may be coupled to two or more microphone devices. One such microphone device may be integrated with the computer device itself, another microphone device may be associated with a headset, another microphone device may be associated with a webcam device, and so on. Likewise, a computing device may be coupled to two or more video input devices at any given time.

Different input devices may confer different respective benefits. Hence, the abundance of input devices is advantageous because it increases the number of input devices that a user may select from. However, the use of plural input devices also introduces various complications. For example, a user may set up an application module (such as a communication-related software module) to interact with a particular input device, such as headset microphone device. At a later time, however, the user may forget what input device has been associated with the application module. This may cause the user to attempt to interact with the application module using an incorrect input device. The user may, of course, reconfigure the application module to interact with another type of input device. However, this may require a burdensome configuration operation in which the user is asked to expressly identify a new input device and enter new configuration information associated with that new input device. In brief, the use of plural input devices may result in confusion and other manifestations of poor user experience.

SUMMARY

According to one illustrative implementation, a virtual media device is described which includes an input mechanism for receiving one or more input signals from one or more respective media input devices within a computing environment. The virtual media device uses processing functionality to process the input signals to provide at least one output signal for use by a consuming application module. In general, the consuming application module interacts with the virtual media device as if it were a physical media input device. The virtual media device thereby frees the application module and its user from the burden of having to take specific account of the physical media input devices that are connected to the computing environment.

According to another illustrative aspect, the media input devices may include: at least one microphone device; or at least one video device; or at least one microphone device and at least one video device, and so on. Thus, in one configuration, the virtual media device can operate as a virtual microphone device, serving as an abstraction for plural underlying microphone devices. In another configuration, the virtual media device can operate as a virtual video device, serving as an abstraction for plural underlying video input devices.

According to another illustrative aspect, the processing functionality includes one or more processing modules for performing different respective processing operations on the input signals. A configuration module is operative to select one or more of the processing modules based on one or more selection considerations. The processing modules can perform any of: a signal selection operation; a signal mixing operation; a source separation operation; an echo cancellation operation; a gain normalization operation, and so on.

According to another illustrative aspect, the virtual media device can receive one or more supplemental input signals and/or generate one or more supplemental output signals.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 shows illustrative processing functionality that can be used in the virtual media device of FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a virtual media device that "appears" to a consuming application as a single media input device, although the virtual media device may represent one or more underlying physical media input devices. The consuming application and its user can interact with the virtual media device without being burdened by the underlying complexity associated with the actual physical media input devices represented by the virtual media device.

This disclosure is organized as follows. Section A describes an illustrative virtual media device. Section B describes illustrative methods which explain the operation of the virtual media device. Section C describes illustrative processing functionality that can be used to implement any aspect of the features described in Sections A and B.

Figure 9:
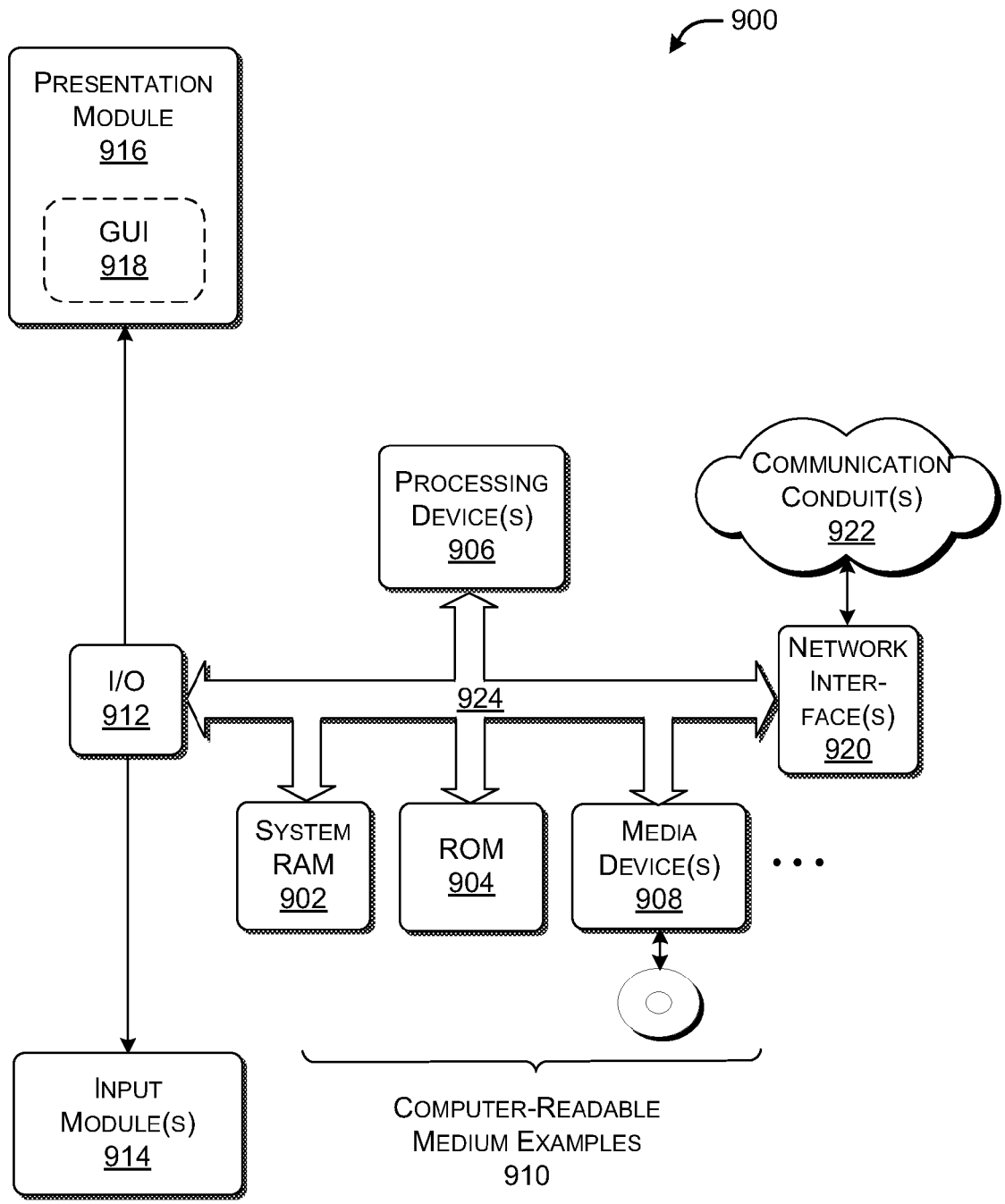
FIG. 9 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 9, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by software, hardware (e.g., discrete logic components, etc.), firmware, manual processing, etc., or any combination of these implementations.

As to terminology, the phrase "configured to" encompasses any way that any kind of functionality can be constructed to perform an identified operation. The functionality can be configured to perform an operation using, for instance, software, hardware (e.g., discrete logic components, etc.), firmware etc., and/or any combination thereof.

The term "logic" encompasses any functionality for performing a task. For instance, each operation illustrated in the flowcharts corresponds to logic for performing that operation. An operation can be performed using, for instance, software, hardware (e.g., discrete logic components, etc.), firmware, etc., and/or any combination thereof.

A. Illustrative Systems

Figure 1:
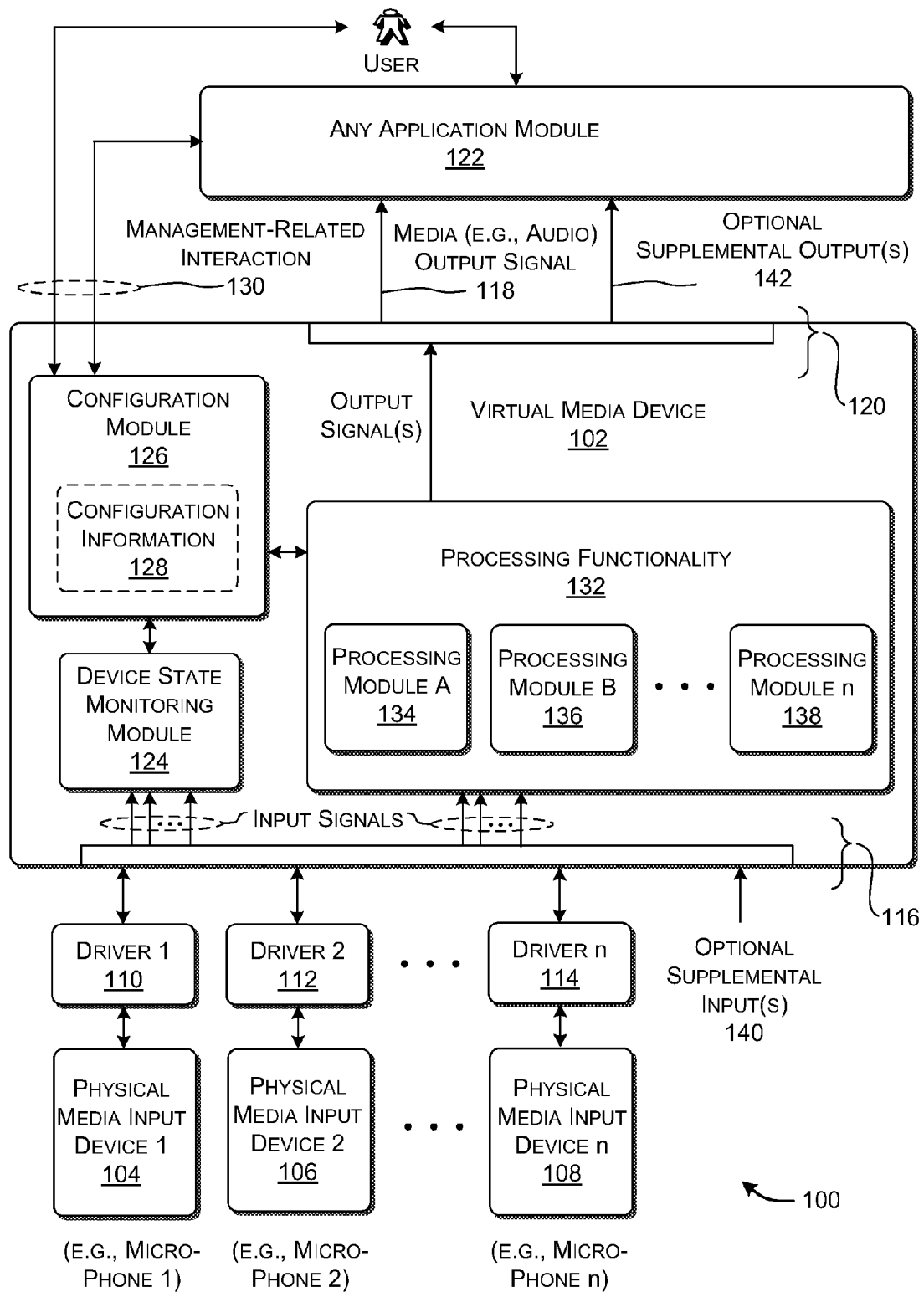
FIG. 1 shows an illustrative system that includes a virtual media device.

FIG. 1 shows an illustrative system 100 in which a virtual media input device 102 ("virtual media device" for brevity) can be used. The virtual media device 102 is referred to as "virtual" because it acts as an abstraction of one or more underlying physical media input devices (104, 106, . . . 108). In one case, the media input devices (104, 106, . . . 108) may correspond to respective microphone devices. In this context, the virtual media device 102 can be referred to as a virtual microphone device. In another case, the media input devices (104, 106, . . . 108) may correspond to respective video input devices. In this context, the virtual media device 102 can be referred to as a virtual video device. In another case, the media input devices (104, 106, . . . 108) may correspond to a combination of microphone input devices and video input devices. The virtual media device 102 can interact with yet other kinds of input devices.

The media input devices (104, 106, . . . 108) can correspond to any type of off-the-shelf peripheral input devices, any type of built-in-type input devices, any type of customized input devices, etc., or any combination thereof. For example, in the realm of audio input devices, one type of media input device may correspond to a default microphone device that is built into a computing device. Another type of media input device corresponds to a speaker module that is incorporated into a communication console. Another type of media input device corresponds to a microphone device provided by a webcam device, and so on.

In one case, the media input devices (104, 106, . . . 108) supply input signals to a computing environment (such as a local computing device) via respective driver mechanisms (110, 112, . . . 114). The virtual media device 102 can receive the input signals through any type of input mechanism 116. The virtual media device 102 then processes the input signals to generate an output signal 118 via an output mechanism 120. Any application module 122 (or any other functionality) can receive the output signal 118 and utilize it for various application-specific purposes.

In general, the application module 122 can interact with the virtual media device 102 as if it were a physical media input device. For example, the application module 122 can correspond to any type of communication application module (such as an instant messenger-type communication module) which accepts input from a microphone device. Instead of coupling this application module 122 to a physical microphone device, the computing environment can couple the application module 122 to the virtual media device 102. The virtual media device 102, in turn, interacts with one or more underlying media input devices (104, 106, . . . 108). The application module 122, as well as the user which interacts with the application module 122, may be unaware of the ultimate origin of the output signal 118 generated by the virtual media device 102. In other words, the application module 122 (and the user) can maintain an agnostic approach as to the underlying set of physical media input devices (104, 106, . . . 108) that may be connected to the virtual media device 102 at any given time.

The above arrangement may confer various benefits. First, the user can set up the computing system 100 so that any application module interacts with the singular virtual media device 102. This simplifies the configuration operation, as the user is no longer tasked with the responsibility of performing configuration for a plurality of individual physical media input devices (104, 106, . . . 108). Second, the user is no longer tasked with the responsibility of keeping track of the association between particular application modules and the media input devices with which they interact. This aspect ensues from the fact that an application module is considered to interact with the virtual media device 102, rather than any particular types of physical media input devices that happen to be coupled to the virtual media device 102 at any given time. Third, the user is no longer tasked with the responsibility of modifying configuration information when a physical media input device is added to or removed from the computing environment. That is, the user may establish communication information that applies regardless of the media input devices that are added or removed. Still other potential benefits may ensue from the above-described arrangement. Generally, the use of the virtual media device 102 may reduce the user's confusion and frustration in interacting with application modules or other functionality that receive media signals.

With the above introduction, the following explanation provides additional details regarding one illustrative implementation of the virtual media device 102. According to one feature, the virtual media device 102 includes a device state monitoring module 124. The device state monitoring module 124 can maintain a list that identifies the media input devices (104, 106, . . . 108) that are coupled to the virtual media device 102 at any given time. The device state monitoring module 124 adds an entry to the list when a media input device is added (e.g., plugged in); the device state monitoring module 124 removes an entry from the list when a media input device is removed (e.g., plugged out). In addition, the device state monitoring module 124 can optionally maintain information which captures the identity and characteristics of each media input device. The device state monitoring module 124 can execute any type of discovery protocol to collect attribute information from the available media input devices (104, 106, . . . 108).

A configuration module 126 manages the configuration of the virtual media device 102, and in so doing, maintains configuration information 128 which describes that configuration. The configuration module 126 can operate in different ways depending on different implementations and/or modes of selected operation. In one case, a user can directly interact with the virtual media device 102, e.g., via one or more user interface presentations hosted by the configuration module 126. Through this interface, the user can configure the virtual media device 102 to operate in a particular manner, thereby establishing the configuration information 128. In one case, the configuration information 128 entered in this manner can apply across different application modules that utilize the virtual media device 102.

In addition, or alternatively, different application modules can provide respective interfaces for configuring the virtual media device 102. Through this mechanism, the user can configure the virtual media device 102 on a per-application basis. In doing so, the user can create multiple instances of the configuration information 128. Each instance of the configuration information 128 applies to a different respective application module. In this implementation, the configuration information 128 can be maintained by the virtual media device 102, or by each respective application module, or by both the virtual media device 102 and the application modules. Still other strategies and mechanisms can be used to establish the configuration information 128.

The configuration information 128 itself can govern any aspect of the behavior of the virtual media device 102. For instance, the user or the application module 122 can establish configuration information 128 which sets forth preferred media input devices to be used, e.g., by assigning preference scores to different possible media input devices. The user or the application module 122 can also establish configuration information 128 which describes the preferred characteristics of the input signal to be accepted by the virtual media device 102. The user or application module 122 can also provide configuration information 128 that identifies the preferred characteristics of the output signal to be produced by the virtual media device 102. The user or application module 122 can also establish configuration information 128 which defines which processing operations are to be performed on the input signal (or plural input signals), and so on.

In certain cases, the configuration information 128 can be expressed as context-independent instructions. For example, such a configuration rule may instruct the virtual media device 102 to perform operation W regardless of what media input devices are coupled to the virtual media device 102. Alternatively, or in addition, the configuration information 128 can be expressed by rules (or the like) which take account for different operating conditions. For example, a configuration rule may specify that if media device X and media device Y are coupled to the virtual media device, then the virtual media device 102 is to perform operation Z. Another such rule may specify that if environmental condition S is present, then the virtual media device 102 is to perform operation T, and so on.

FIG. 1 shows management-related interaction 130 that occurs between the application module 122 (or any other functionality or entity) and the virtual media device 102. This management-related interaction 130 generally represents any mechanism through which the above-described configuration information 128 can be established and maintained. As described above, in one case, the user can directly interact with the virtual media device 102 to establish the configuration information 128. In another case, the user can establish the configuration information 128 indirectly through the application module 122.

The virtual media device 102 also includes processing functionality 132. The processing functionality 132 governs the actions that are performed on the input signals received from the media input devices (104, 106, . . . 108). The processing functionality 132, in turn, may include multiple processing modules (134, 136, . . . 138). Each processing module corresponds to a mechanism for performing a particular type of processing on the input signals. FIG. 4 will be used as a vehicle for explaining representative functions that can be performed by different processing modules (134, 136, . . . 138). By way of overview, at least one of the processing modules (134, 136, . . . 138) may function as a selection or multiplexing mechanism. This type of processing module operates to select one or more input signals from a larger group of input signals based on any criteria. At least one other type of processing module may function as a combination or mixing mechanism. This type of processing module operates to combine together two or more input signals in any manner based on any criteria. Again, FIG. 4 will be used to elaborate on the functions that may be performed by the processing modules (134, 136, . . . 138).

In one case, the virtual media device 102 uses one of the processing modules (134, 136, . . . 138) at any given time to produce an output signal. In another case, the virtual media device 102 can use two or more processing modules (134, 136, . . . 138) at any given time to produce the output signal. In the latter case, the virtual media device 102 can combine the processing modules (134, 136, . . . 138) together in any manner to build more complex functionality. For example, the output of one processing module can serve as input which feeds into another processing module, and so on.

In one implementation, the configuration module 126 governs which processing modules (134, 136, . . . 138) are selected at any given time. In making this selection, the configuration module 126 can receive guidance from the configuration information 128 in the manner described above. To repeat, some configuration considerations may instruct the processing functionality 132 to apply one or more processing modules (134, 136, . . . 138) in a largely context-independent manner. Other configuration considerations may instruct the processing functionality 132 to apply one or more processing modules (134, 136, . . . 138) in a manner which varies based on various contextual factors. Such contextual factors may pertain to the types of input devices that are connected to the virtual media device 102, the prevailing environmental conditions in which input signals are being received, the quality of the input signals, and so on.

In certain cases, the configuration module 126 can incorporate intelligence which enables the virtual media device 102 to more independently select which processing modules (134, 136, . . . 138) are to be used at any given time. For example, the virtual media device 102 can enumerate different processing operations that can be performed on the input signals at any given time using available processing modules. The virtual media device 102 can also identify the resultant quality of output signals produced by these different operations. The configuration module 126 can then select the type or combination of processing operations which produces the best quality of output signal or which addresses some other identified objective.

Any change in state may cause the configuration module 126 to reevaluate the processing modules (134, 136, . . . 138) that are being used. For example, the configuration module 126 can reevaluate the choice of processing modules when any media input device is added or when any media input device is removed. Further, the configuration module 126 can reevaluate the choice of processing modules when any environmental condition changes, such as when the noise in a setting increases above a prescribed threshold, and so on. No limitation is placed on the myriad of ways in which the virtual media device 102 can dynamically decide which processing modules (134, 136, . . . 138) are to be applied to the input signals.

FIG. 1 shows that, in addition to media-related input signals, the virtual media device 102 can receive one or more supplemental inputs 140. The supplemental inputs 140 may provide supplemental information that has a bearing on the processing performed on the media-related input signals by the processing functionality 132. For example, consider the case in which the virtual media device 102 receives audio input signals from two or more microphone devices. The virtual media device 102 may also receive a visual input signal which may provide some clue as to the location or nature of the source of the audio information. The processing functionality 132 can use this visual input signal to improve its processing of the audio input signals. In another case, a supplemental input can allow the processing functionality 132 to identify and remove echoes from the audio input signals (as will be described below).

In one case, the media output signal 118 comprises a single stream of media information, such as a single channel of audio information. In another case, the media output signal 118 can comprise plural streams of media information, such as plural channels of audio information, or a combination of audio information and video information, and so on. The output signal 118 is expressed in a format that may be selected based on one or more factors. One such factor may correspond to the preferences established by the configuration information 128.

The virtual media device 102 can also generate one or more supplemental output signals. For example, the virtual media device 102 can provide an output signal 142 which provides any type of metadata that accompanies the media-related output signal 118. For example, consider the case in which the virtual media device 102 processes input signals from plural microphone devices. The supplemental input signal 142 in this case can identify the microphone device (or devices) that have contributed to the output signal 118.

Figure 2:
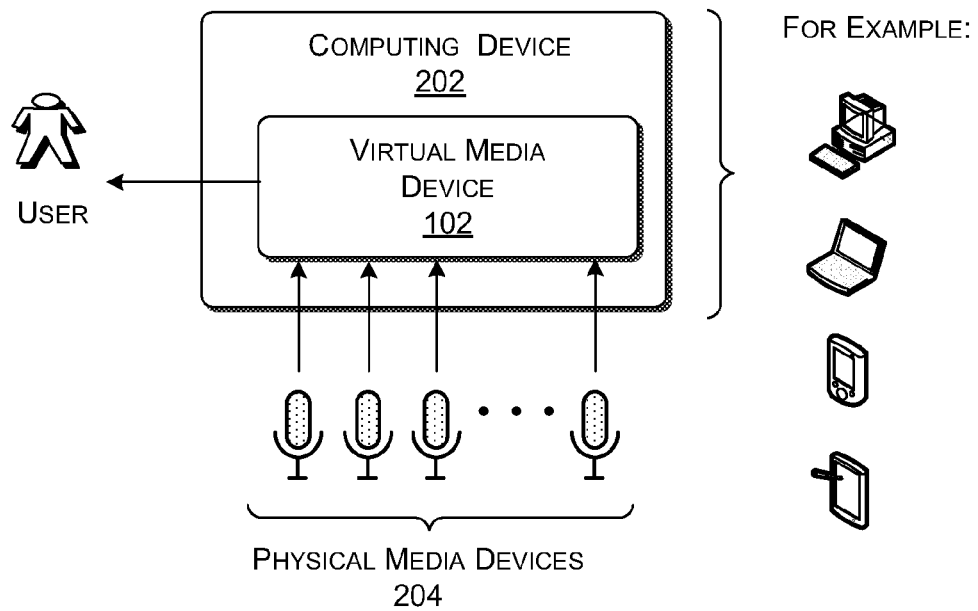
FIG. 2 shows one computing environment in which the virtual media device of FIG. 1 can be used.
Figure 3:
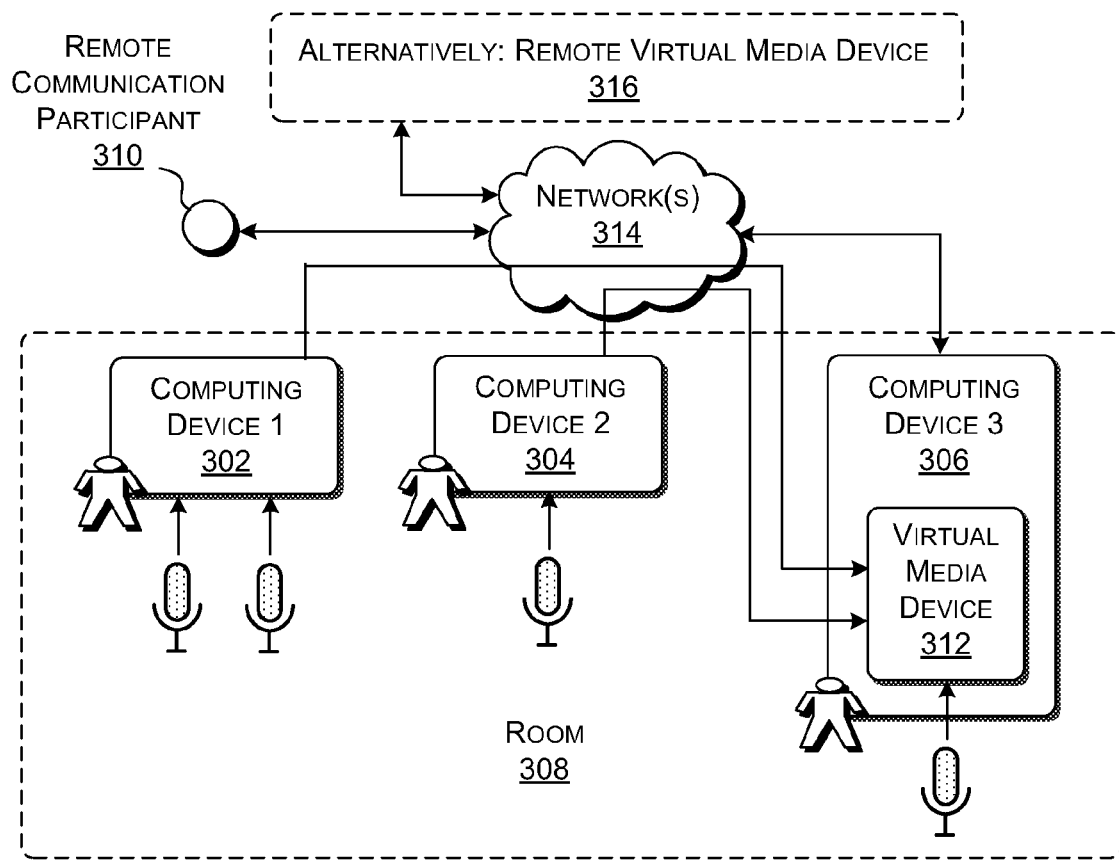
FIG. 3 shows another illustrative computing environment in which the virtual media device of FIG. 1 can be used.

As mentioned above, the system 100 of FIG. 1 can be applied in different computing environments. FIG. 2 represents one such environment corresponding to a local computing device. FIG. 3 represents another such environment corresponding to a group-related environment.

Considering FIG. 2 first, this figure shows a local computing device 202 that incorporates the virtual media device 102 of FIG. 1, e.g., as a program module that is executed by the computing device 202. In this representative case, assume that the virtual media device 102 accepts input signals from plural microphone devices 204 (although the virtual media device 102 can accept input for any type of media input device). The computing device 202 can represent any type computing device, such as a personal desktop computing device, a laptop computing device, a personal digital assistant (PDA) type computing device, a stylus-type computing device, a mobile phone type computing device, a game console device, a set-top box device, and so on.

FIG. 3 shows a computing environment in which plural computing devices (e.g., 302, 304, 306) are being used by associated users within a room 308 or other group setting. For example, the scenario of FIG. 3 may correspond to the case in which plural users in the room 308 operate their respective computing devices (302, 304, 306) to conduct a meeting with a remote participant 310. Each of the computing devices (302, 304, 306) may interact with one or more media input devices, such as one or more microphone devices.

In this case, a virtual media device 312 can be employed on one of the computing devices (302, 304, 306), such as computing device 306. The virtual media device 312 operates in the manner described above by accepting plural input signals and generating an output signal for use by an application module or other functionality. Here, however, the input signals originate from different computing devices. To achieve this result, the computing devices (302, 304, 306) can interact with each other via a network 314 of any type, such as a local area ad hoc network, etc. Alternatively, the virtual media device 316 can be located at a remote site relative to the room 308, as represented by the operational network-accessible virtual media device 316.

The cases shown in FIGS. 2 and 3 are representative. The virtual media device 102 can be employed in other contexts besides the scenarios shown in FIGS. 2 and 3.

Without limitation, FIG. 4 shows a representative collection of processing modules that can be used within the processing functionality 132. To begin with, a best device selection module 402 receives plural input signals and outputs a single output signal (or plural output signals) based on any criterion or plural criteria (e.g., based on any selection consideration or plural selection considerations). For example, in one case, the best device selection module 402 can determine, on a dynamic basis, the signal-to-noise ratio (or other performance metric or metrics) associated with the input signals over a prescribed period of time. The best device selection module 402 can then select the input signal that has the most satisfactory performance, however defined. In another example, the best device selection module 402 can consult the configuration information 128 to determine the preferred characteristics of the input signal. The best device selection module 402 can then select the input signal which most appropriately matches the preferences of the configuration information 128. Still other considerations may play a part in the selection of one or more signals from a larger collection of input signals. The selection of the signal(s) may be dynamic, meaning that the best device selection module 402 can change its selection over time based on the detected characteristics of the input signals.

A gain normalization module 404 normalizes the gain associated with one or more input signals.

A source separation module 406 identifies one or more separate sources of information in one or more input signals. For example, the source separation module 406 can identify the presence of noise amidst desired audio information. The source separation module 406 can then separate the two or more distinct parts of an audio signal, such as by removing noise from the desired audio information.

An echo cancellation module 408 can identify an echo within audio information and then attempt to remove the echo. In one case, the echo cancellation module 408 can facilitate the removal of an echo by providing a loudspeaker which generates sounds. The echo cancellation module 408 can receive an input signal (or plural input signals) which captures the sounds via one or more microphone devices. The echo cancellation module 408 can also receive an original signal that drives the loudspeaker. The echo cancellation module 408 can then process these signals to offset the effects of echo.

A mixer module 410 combines two or more input signals in any manner to produce an output signal (or plural output signals). For example, the mixer module 410 can average together various audio input signals to produce a single audio output signal. By virtue of the mixing, the audio output signal may have better quality that any of the individual input signals. In another case, the mixer module 410 can interleave different input streams together in any manner.

FIG. 4 also shows a generically-labeled box "other modules" 412 which indicates that yet other types of processing modules can be encompassed by the processing functionality 132.

The examples described above pertain to the use of processing modules to process audio-related input signals. Other processing modules (not shown) can be used to process video input signals. For example, a best device selection module can be used to select a video-related input based on any criteria (such as signal quality, desired field-of-view, etc.). A video mixer module can be used to interleave two different video-related input signals together to produce various effects, such as a stereoscopic video image, and so on. Other processing modules can accept and process yet other types of media input signals. For example, other processing modules can accept both audio-related input signals and video-related input signals and perform some operation on these signals. Finally, any of the processing modules can also accept and process non-media related input signals, such as a signal provided by any type of activity detector, etc.

In one case, each processing module can provide a standard input-output interface that is appropriate to a particular class of functions to which it belongs. For example, consider a class of processing modules that provides a multiplexing (selection) function. This type of processing module can accept input signals that have prescribed characteristics and can produce an output signal that has prescribed characteristics. By virtue of this standardization, the processing functionality 132 can facilitate the addition and removal of processing modules. Namely, if a new processing module can be produced which conforms to the established input-output standards of the virtual media device 102, then this new processing module can be "plugged into" the processing functionality 132 without otherwise modifying the functionality provided by the virtual media device 102.

Figure 5:
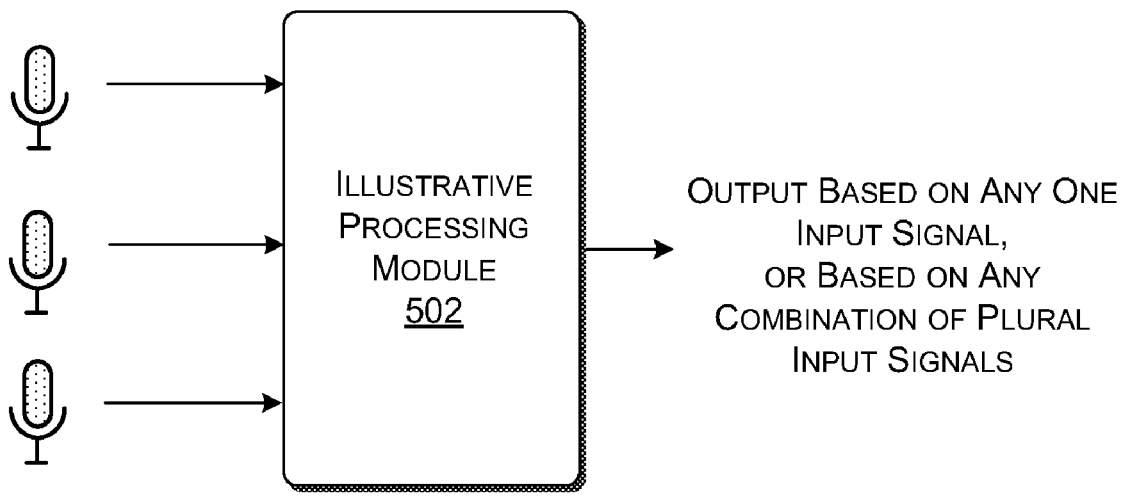
FIG. 5 shows one illustrative application of the processing functionality of FIG. 4 to generate an output signal.

In one case, as stated above, the configuration module 126 can prompt the processing functionality 132 to select a single processing module from among a collection of possible processing modules. FIG. 5 presents this scenario. Here, an illustrative processing module 502 accepts input from three microphone devices and produces a single output signal. The output signal may be based on any one or more of the input signals.

Figure 6:
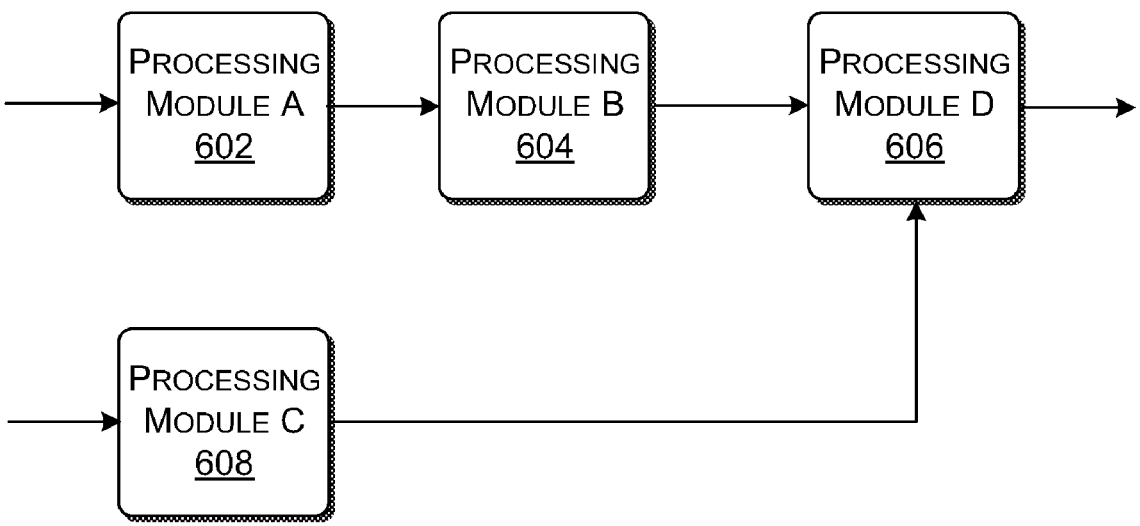
FIG. 6 shows another illustrative application of the processing functionality of FIG. 4 to generate an output signal.

FIG. 6 represents the case in which the configuration module 126 prompts the processing functionality 132 to use plural processing modules to process one or more input signals. In this merely representative case, the configuration module 126 selects four processing modules (602, 604, 606, 608). The processing modules can be combined in series, as in the case of processing modules 602, 604, and 606. Further, the processing modules can operate in parallel (as in the case of processing module 602 and processing module 608). Further, the results of two or more processing modules can feed into another processing module (as in the case of processing module 604 and processing module 608, which feed into processing module 606).

B. Illustrative Processes

Figure 7:
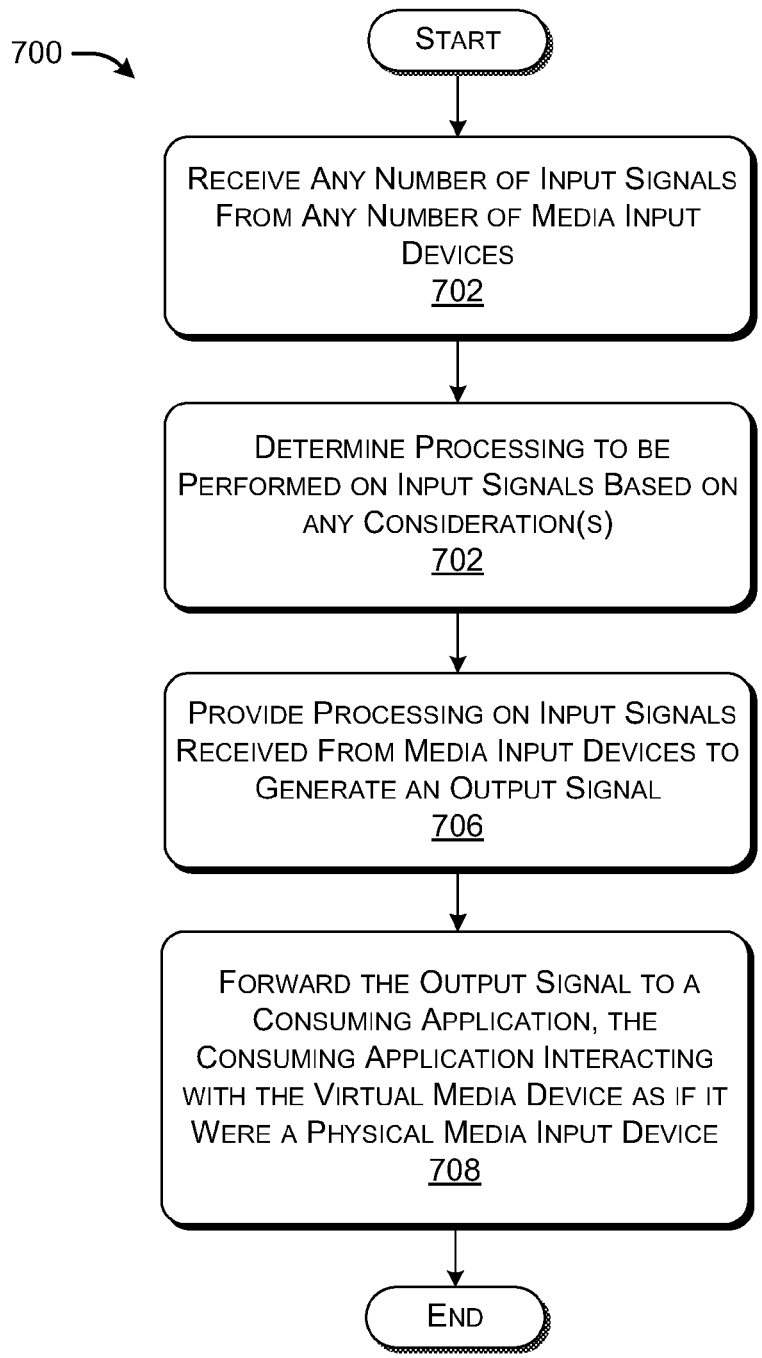
FIG. 7 shows an illustrative procedure which provides an overview of the virtual media device of FIG. 1.
Figure 8:
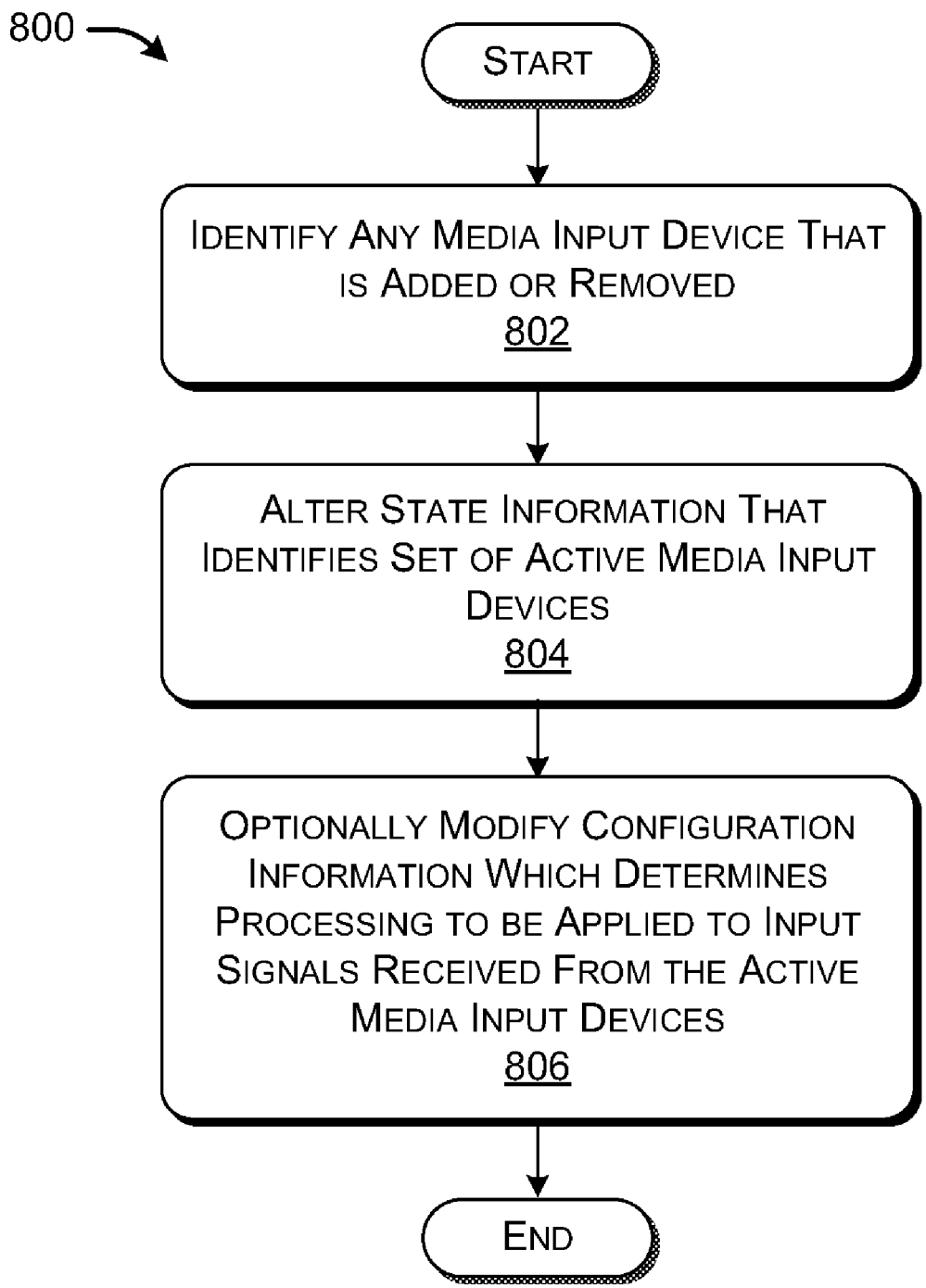
FIG. 8 shows an illustrative procedure that sets forth operations performed by the virtual media device when media input devices are added or removed.

FIGS. 7 and 8 show procedures which explain the operation of the system 100 of FIG. 1. Since the principles underlying the operation of virtual media device 102 have already been described in Section A, certain operations will be addressed in summary fashion in this section.

Starting with FIG. 7, this figure shows a procedure 700 which provides an overview of the operation of the virtual media device 102.

In block 702, the virtual media device 102 accepts any number of input signals from any number of physical media input devices.

In block 704, the virtual media device 102 determines the processing to be performed on the input signals based on any consideration or combination of considerations. As explained above, in some cases, the virtual media device 102 may establish context-independent rules which define the operations to be performed on the input signals. In other cases, the virtual media device 102 may establish context-sensitive rules which define the operations to be performed. In one case, the analysis associated with block 704 can be performed upon prescribed triggering events (such as the introduction or removal of a media input device); in another case, the analysis associated with block 704 can be performed on a more ongoing basis In block 706, the virtual media device 102 performs the selected operations on the signals to provide an output signal.

In block 708, the virtual media device 102 forwards the output signal to an application module or other entity.

FIG. 8 shows a procedure 800 which explains events which may occur upon the addition or removal of media input devices.

In block 802, the virtual media device 102 receives an indication that a media input device has been added or removed.

In block 804, the virtual media device 102 alters state information which describes a list of active media input devices. For new media input device, the virtual media device 102 can optionally invoke a discovery protocol which collects information regarding the media input device.

In block 806, the virtual media device 102 optionally modifies the configuration information which determines the type of processing to be performed on the input signals provided by the media input devices.

Although not shown, the virtual media device 102 can also modify the configuration information based on detected changes in an operating environment, such as a detected increase in noise to the environment, or the like.

C. Representative Processing Functionality

FIG. 9 sets forth illustrative electrical data processing functionality 900 that can be used to implement any aspect of the functions described above. With reference to FIG. 1, for instance, the type of processing functionality 900 shown in FIG. 9 can be used to implement any aspect of the system 100, including the virtual media device 102. In one case, the processing functionality 900 may correspond to any type of computing device that includes one or more processing devices.

The processing functionality 900 can include volatile and non-volatile memory, such as RAM 902 and ROM 904, as well as one or more processing devices 906. The processing functionality 900 also optionally includes various media devices 908, such as a hard disk module, an optical disk module, and so forth. The processing functionality 900 can perform various operations identified above when the processing device(s) 906 executes instructions that are maintained by memory (e.g., RAM 902, ROM 904, or elsewhere). More generally, instructions and other information can be stored on any computer readable medium 910, including, but not limited to, static memory storage devices, magnetic storage devices, optical storage devices, and so on. The term computer readable medium also encompasses plural storage devices. The term computer readable medium also encompasses signals transmitted from a first location to a second location, e.g., via wire, cable, wireless transmission, etc.

The processing functionality 900 also includes an input/output module 912 for receiving various inputs from a user (via input modules 914), and for providing various outputs to the user (via output modules). One particular output mechanism may include a presentation module 916 and an associated graphical user interface (GUI) 918. The processing functionality 900 can also include one or more network interfaces 920 for exchanging data with other devices via one or more communication conduits 922. One or more communication buses 924 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by a virtual media device, comprising:
    collecting device attribute information describing each of a plurality of media input devices within a computing environment;
    selecting at least one input signal from at least one media input device of the plurality of media input devices based at least in part on the collected device attribute information and configuration information corresponding to a consuming application module, the configuration information comprising:
        individual preference scores for individual media input devices of the plurality of media input devices; and
        one or more prescribed output signal characteristics or input signal characteristics;
    processing said at least one selected input signal to provide an output signal; and
    forwarding the output signal to the consuming application module,
    the consuming application module interacting with the virtual media device as if the virtual media device were a physical media input device, the virtual media device allowing one or more of the individual media input devices to be dynamically added and removed without manual modification of the configuration information.

2. The method of claim 1, wherein said at least one media input device includes at least one microphone device.

3. The method of claim 1, wherein said at least one media input device includes at least one video input device.

4. The method of claim 1, wherein said at least one media input device includes at least one microphone device and at least one video input device.

5. The method of claim 1, further including receiving at least one supplemental input, wherein said processing also involves processing said at least one supplemental input.

6. The method of claim 1, wherein said selecting is further based on a performance metric of the at least one selected input signal.

7. The method of claim 1, wherein said at least one selected input signal encompasses at least two inputs signals, and wherein said processing involves mixing together said at least two input signals to generate the output signal.

8. The method of claim 1, wherein said processing involves processing said at least one selected input signal to perform a source separation operation.

9. The method of claim 1, wherein said processing involves processing said at least one selected input signal to perform an echo cancellation operation.

10. The method of claim 1, wherein said processing involves processing said at least one selected input signal to perform a gain normalization operation.

11. The method of claim 1, further comprising generating at least one supplemental output signal.

12. A system comprising:
    a virtual media device comprising:
        an input mechanism configured to receive at least one input signal from at least one media input device within a computing environment;
        processing functionality configured to process said at least one input signal to provide an output signal, the processing functionality comprising one or more processing modules for performing different respective processing operations on the at least one input signal; and
        a configuration module configured to maintain configuration information usable by the virtual media device to select at least one of the one or more processing modules based on the configuration information, the configuration information comprising:
            individual media input device preference scores; and
            one or more prescribed output signal characteristics or input signal characteristics; and
    a consuming application module configured to interact with the virtual media device based on the configuration information without having to take account of characteristics of said at least one media input device and as if the virtual media device were a physical media input device.

13. The system of claim 12, wherein said at least one media input device includes:
    at least one microphone device; or
    at least one video device; or
    at least one microphone device and at least one video device.

14. The system of claim 12, wherein the virtual media device further comprises a device state monitoring module configured to monitor a presence of said at least one media input device that is coupled to the virtual media device at any given time, wherein the virtual media device is configured to allow individual media input devices to be dynamically added and removed without manual modification of the configuration information.

15. The system of claim 12, wherein the computing environment corresponds to a local computing device, said at least one media input device being coupled to the local computing device.

16. The system of claim 12, wherein the computing environment corresponds to a network environment in which said at least one media input device encompasses at least two media input devices, said at least two media input devices being coupled to two or more computing devices in the network environment.

17. The system of claim 12, wherein said at least one media input device is coupled to the computing environment via at least one respective driver mechanism.

18. A computer readable medium for storing computer readable instructions, the computer readable instructions providing a virtual microphone device when executed by one or more processing devices, the computer readable instructions comprising:

logic configured to receive at least two input signals from at least two microphone devices within a computing environment;

logic configured to process said at least two input signals to provide an output signal, said logic configured to process comprising two or more processing modules configured to perform different respective processing operations on said at least two input signals;

logic configured to select one or more of the processing modules based on collected device information associated with the at least two microphone devices and configuration information corresponding to a consuming application module configured to interact with the virtual microphone device, the configuration information comprising:

individual preference scores for individual media input devices of the plurality of media input devices; and one or more prescribed output signal characteristics or input signal characteristics; and logic configured to forward the output signal to the consuming application module, the consuming application module configured to interact with the virtual microphone device as if the virtual microphone device were a physical microphone device without having to take account of characteristics of each of said at least two microphone devices.

\* \* \* \* \*